April 18, 1933.   C. FIELD   1,904,027
REEL
Original Filed June 18, 1927   2 Sheets-Sheet 1

INVENTOR
Crosby Field
BY
ATTORNEY

April 18, 1933.                C. FIELD                1,904,027
                                REEL
                    Original Filed June 18, 1927    2 Sheets-Sheet 2
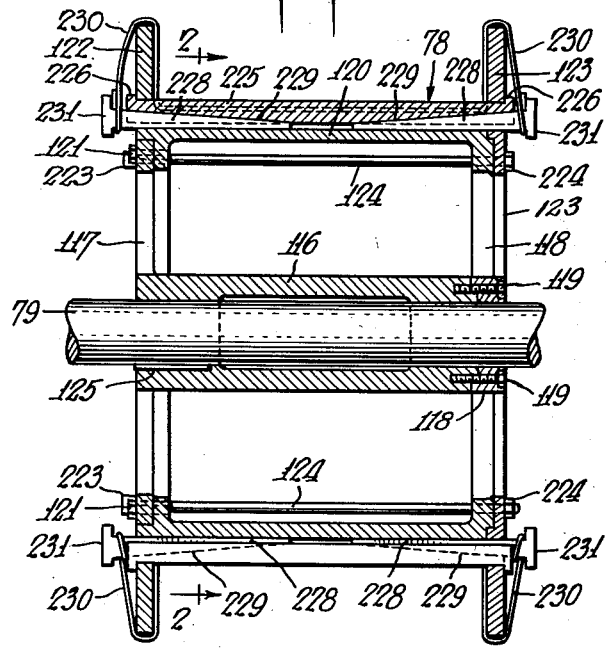
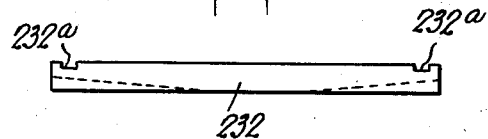
INVENTOR
Crosby Field
BY
ATTORNEY Patented Apr. 18, 1933

1,904,027

UNITED STATES PATENT OFFICE

CROSBY FIELD, OF BROOKLYN, NEW YORK, ASSIGNOR TO BRILLO MANUFACTURING COMPANY, INC., A CORPORATION OF NEW YORK

REEL

Original application filed June 18, 1927, Serial No. 199,692, now Patent No. 1,886,661, dated November 8, 1932, and in Canada June 11, 1928. Divided and this application filed April 1, 1931. Serial No. 526,837.

My present invention relates more particularly to reel adapted to the purposes set forth in my copending application, Ser. No. 199,692, filed June 18, 1927, now Patent 1,886,661, issued November 8, 1932, of which this application is a division, and also in my Patents Nos. 1,608,478 and 1,608,481, dated November 23rd, 1926, and while many of its features are adapted for use in other relations, most of them have advantages that are better understood in connection with the requirements of machines such as set forth in my said application. These machines are for making metal wool from wire, and a number of large cutting units are employed each consisting of a traction rotor having a plurality of adjacent grooves formed in its periphery, in which the wire is frictionally engaged so that it is carried by the rotor, operating as a bed, in operative relation to a series of stationary cutters arranged around the periphery. The necessary friction to hold the loops of wire as it were integral with the periphery of the rotor is insured by end tension on the wire. My present construction of reel is well adapted to afford this end tension.

Preferably, a single wire is led in a succession of loops curving in the same direction, around a number of the cutter units, large enough to enable the wire to be cut to scrap. In such a machine, it is highly desirable to have reels of capacity sufficient to accommodate great lengths of wire. The ordinary bundle coils obtainable in the market are of limited length, weighing approximately 300 pounds, and in this connection the reel which I employ is one on which a number of coils of the usual weight may be wound, the end of the wire of one coil being welded to the end of the wire of the next succeeding coil, thus producing a single coil which may weigh, say, 4,000 pounds and may be between 1 and 2 miles in length even when heavy wire is employed.

The above and other purposes are employed in a wheel construction adapted to level wind the wire under heavy tension, the mechanism being such that it may be quickly shifted from winding to unwinding. In the above machine, the winding operation may be for the purpose of supplying the original welded lengths of wire to the reel or for winding up the scrap at the end of the machine while the principal unwinding use is at the supply end of the machine, but only the first winding and the machine supply positions are indicated herein.

The winding operation may be employed in connection with means for testing and breaking any bad spots in the wire before it passes to the reel, as more fully described and claimed in another divisional application Ser. No. 297,320, filed August 3, 1928.

The wire is conducted to the winding reel through a stationary straightener and for level winding it is necessary to have the winding reel feed back and forth axially of its shaft at a rate dependent on the size of the wire. The feeding mechanism may include two screws extending parallel with the reel supporting shaft, which screws are supported by brackets on said shaft to revolve about the latter. To rotate the screws, there is provided planetary gearing operable by a fixed central or sun gear supported on the axis of the reel shaft, said gearing including gears on the feed screws. Screw engaging means may be supported on the reel, which is shiftable from one screw to the other in order to reverse the axial feed of the reel.

The means for automatically effecting the reversal of the feed of said reel includes a trigger mechanism, which is operated at the end of the feed of the reel, in either direction, to shift the screw engaging mechanism from one screw to the other.

After the reel has become filled, it may be interchanged with the reel from which the wire is supplied to the machine. When the wire is unwound into the cutting machine, the transverse feeding mechanism may be rendered ineffective and to this end I have provided means to facilitate disconnection of the gears on the feed screws from the sun gear, the pinions in the planetary gearing being carried on a support which is adjustable so as to take one of said pinions out of engagement with the gear of the feed screw. The pinions are also settable to reverse the rotation of the feed screws.

The reel at the exit end of the machine for receiving the wire, which has been reduced to scrap, may be similar in construction to the winding reel and the supply reel.

The above described features relating to the transverse feeding mechanism, are claimed in my application Ser. No. 297,316, now Patent 1,826,758 of which this case is a subdivision, relating more particularly to the exterior reel or drum structure.

The strains to which these reels are subjected are very great due to the weight of the wire handled thereby. Accordingly, the drum or reel proper is constructed so as to withstand these strains. The reel is also constructed so as to facilitate the removal of the coil of waste wire therefrom. To this end, one of the flanges of the reel is detachably supported thereon and held in place by suitable bolts. To further assist in holding the flange on the drum, and to reenforce the reel, there are provided cross bars or beams which may be inserted through suitable slots formed in both flanges. They extend over a drum part of the reel and engage both flanges; said beams being held in cooperative relation therewith by suitable wedges which are forced in between the surface of the drum and the beams. The wire, instead of being supported directly by the drum part of the reel, is supported by the beams which are placed around the periphery of the drum. This leaves space between the beams in which suitable binding wires may be placed before the waste wire is started on the reel. These binding wires extend over the flanges of the reel and their ends may be twisted around the wedges which hold the beams in place. When the reel is filled, the ends of the binding wires are untwisted from the wedges and folded over the reel to bind it together. The reel may then be removed with its supporting shaft from the bearings, in any suitable manner, after which the wedges are withdrawn to enable the beams to be removed from the reel. The detachable flange may then be removed, and the reel is then set up on end so as to cause the coil of wire to slide from the drum at the end from which the flange has previously been removed. After the coil of waste wire has been removed, the reel may be re-assembled.

The above and other features of my invention will be more evident from the following description in connection with the accompanying drawings, in which Fig. 1 is an end elevation of the reel;

Fig. 3 is a sectional top plan view of the reel, taken on the line 3—3 of Fig. 2; and Fig. 4 shows another form of beam or bar used in the reel.

Figure 1:
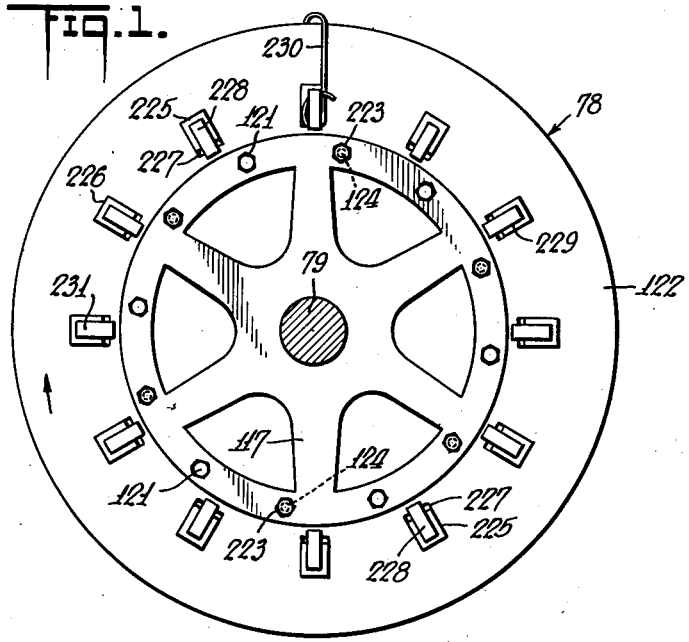

The reel structure includes a hub portion 116 on the shaft 79 (Figs. 1 to 3 inclusive) and two spoked ends 117 and 118, the end 117 being integral with the hub 116, the hub portion of the end 118 being secured to the hub 116 by screws 119. The reel further includes a drum 120 which is integral with the spoked end 118 and extends therefrom to the spoked end 117, where it is secured to the latter by screws 121. End flanges 122 and 123 confine the coil of wire on the drum. The flange 122 may be integral with the drum 120. The flange 123, however, may be detachably secured to the reel by bolts 124, so that the coil of wire may be readily removed from the reel in a manner hereinafter described. The reel 78 is caused to rotate with the shaft 79 by means of a key 125.

Figure 2:
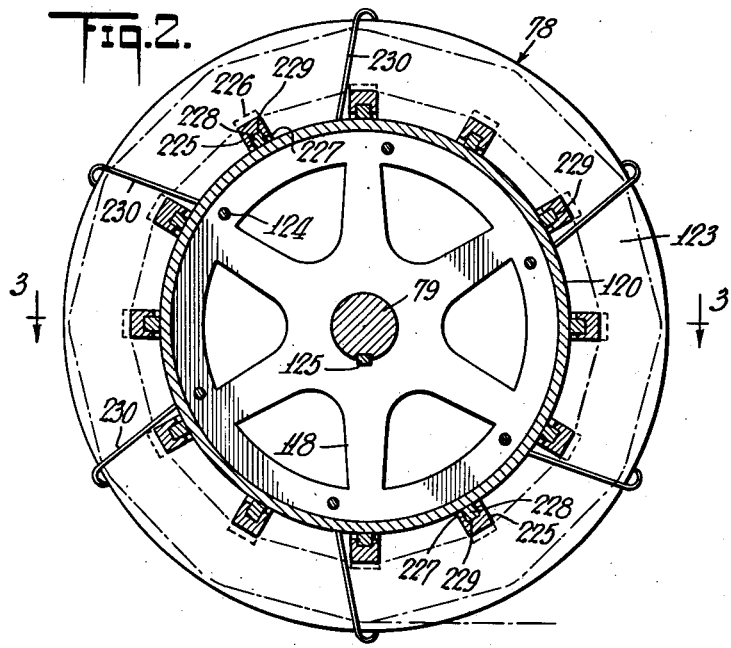
Fig. 2 is a sectional view taken on the line 2—2 of Fig. 3.

When a wire coil is to be removed bodily from the reel, as for instance, when the reel is used to wind up the wire at the exit end of a machine for cutting the wool, the removal is facilitated by having the flange 123 (Fig. 3) detachably supported thereon and held in its assembled position by bolts 124, having heads 223 engaging one side of the reel and nuts 224 engaging the flange 123 at the other end of the reel. Beams or bars 225 are arranged around the periphery of drum 120 of said reel. Each beam has projections 226 at its ends to engage the outside of the flanges 122 and 123 to thus prevent spreading thereof, and consequently assist in holding the flanges 123 on the reel. Said beams 225 are located in slots 227 formed in the flanges 122 and 123 (Fig. 1) which slots are large enough to permit insertion or removal of said beams therethrough. After the insertion of each beam through a slot, it is moved radially on the reel, and away from the reel axis, into engaging relation with the flanges 122 and 123 to hold each beam in its effective holding position. Wedges 228 are provided which extend into grooves 229 formed in the beams, said wedges engaging the bottom of said grooves and the periphery of the drum. With this arrangement, the wire is not carried directly by the drum 120, but is supported by the beams 225, as indicated in Fig. 2, so that stresses produced by the weight of the wire are actually in the ends of the reel and not in the drum 225.

To facilitate the removal of a coil of wire from the reel, binding wires 230 may be stretched over the drum from side to side thereof and bent over the flanges 122 and 123 so that their ends may be twisted around the protruding ends of the wedges 228. When the reel has become filled, the ends of the binding wires are untwisted from the wedges and are brought together and twisted over the coil to thus bind the latter. After the coil has been thus bound, the reel, with its supporting shaft 79, may be removed from its bearings. The wedges may then be removed, their ends being provided with heads 231 to be engaged by a suitable wedge removing tool, not shown. After the wedges have been removed, each bar may be moved radially toward the axis of the drum, to enable it to be withdrawn through the slots 227. The flange 123 may then be removed from the drum 120 by loosening the nuts 224. The reel is then set up on end so as to cause the coil of wire to slide down from the drum at the end from which the flange has previously been removed. After the removal of the coil of wire, the reel may be reassembled for future use.

A modified form of beam 232 (Fig. 4) may be used instead of the beam 225, and it may be provided with slots 232a so that each of the flanges 122 and 123 may be embraced by the bar or, in other words, engaged on both sides, thus adding to the rigidity of the reel.

I claim:

1. A reel for winding wire, including a drum, two flanges, one of said flanges being rigid on said drum, the other flange being detachably secured to said drum so that a coil of wire formed on the drum may be removed therefrom; a set of endwise removable bars extending between said flanges and projecting radially beyond the surface of the drum to form bearing surfaces for the coil; and a set of endwise movable wedge elements for forcing said bars to and locking them in their radially projected positions.

2. A reel for winding wire, including disc like ends supported on a shaft, a drum connecting said ends, flanges extending from said drum, beams extending between said flanges and over the drum to carry the wire wound on the reel, means to facilitate the removal of one of said flanges to facilitate the removal of a coil of wire from the reel, said flanges having apertures through which the beams may be inserted and through which they extend when assembled, lugs on each beam, to engage the flanges, and means associated with each beam to move it radially outward from the axis of the reel into effective relation with said flanges.

3. A reel for winding wire, including disc like ends supported on a shaft, a drum connecting said ends, flanges extending from said drum, beams extending between said flanges and over the drum to carry the wire wound on the reel, means to facilitate the removal of one of said flanges to facilitate the removal of a coil of wire from the reel, said flanges having apertures through which the beams may be inserted and through which they extend when assembled, lugs on each beam, each beam having a groove in the side facing the drum, and wedges to enter the groove from both sides to move the beams radially outward from the axis of the reel into effective relation with said flanges.

4. A reel for winding wire, including a drum, two flanges rigid on said drum, one of said flanges being detachably secured to said drum so that a coil of wire formed on the drum may be removed therefrom, a plurality of endwise removable bars extending between said flanges to assist in holding the reel assembled and wedge elements to hold the bars in their effective positions.

Signed at Brooklyn in the county of Kings and State of New York this fifth day of March, A. D. 1931.

CROSBY FIELD.